(12) United States Patent
Chuang

(10) Patent No.: US 9,948,217 B2
(45) Date of Patent: Apr. 17, 2018

(54) SYNCHRONOUS ENERGY SOURCE SWITCHING CONTROLLER AND METHOD OF OPERATION THEREOF

(71) Applicant: Atieva, Inc., Redwood City, CA (US)

(72) Inventor: Chia-Ming Chuang, Taipei (TW)

(73) Assignee: Atieva, Inc., Menlo Park, CA (US)

( * ) Notice: Subject to any disclaimer, the term of this patent is extended or adjusted under 35 U.S.C. 154(b) by 27 days.

(21) Appl. No.: 14/834,310

(22) Filed: Aug. 24, 2015

(65) Prior Publication Data
US 2016/0072414 A1    Mar. 10, 2016

Related U.S. Application Data

(63) Continuation of application No. 13/889,295, filed on May 7, 2013, now Pat. No. 9,118,266.
(60) Provisional application No. 61/643,859, filed on May 7, 2012.

(51) Int. Cl.
| | | |
|---|---|---|
| H02P 1/00 | (2006.01) | |
| H01G 2/12 | (2006.01) | |
| H02P 4/00 | (2006.01) | |
| H02P 9/00 | (2006.01) | |
| B60L 11/18 | (2006.01) | |
| B60K 6/445 | (2007.10) | |
| H02J 7/00 | (2006.01) | |
| H02J 7/34 | (2006.01) | |

(52) U.S. Cl.
CPC ............ H02P 4/00 (2013.01); B60L 11/1864 (2013.01); H02P 9/00 (2013.01); B60K 6/445 (2013.01); H02J 7/0063 (2013.01); H02J 7/345 (2013.01)

(58) Field of Classification Search
CPC .............................. H02P 4/00; B60L 11/1864
USPC .............. 324/503; 320/103, 104; 180/65.22, 180/65.29; 318/139, 400.01
See application file for complete search history.

(56) References Cited

U.S. PATENT DOCUMENTS

| | | |
|---|---|---|
| 6,281,660 B1 | 8/2001 | Abe |
| 7,230,395 B2 | 6/2007 | Horii |
| 7,730,981 B2 | 6/2010 | McCabe et al. |
| 8,022,663 B2 | 9/2011 | Davis et al. |
| 8,314,578 B2 | 11/2012 | Namuduri et al. |
| 2010/0085060 A1 | 4/2010 | Ichikawa |
| 2010/0296204 A1* | 11/2010 | Ichikawa ............... B60K 6/445 361/15 |

OTHER PUBLICATIONS

Notification of Transmittal of the International Search Report and the Written Opinion of the International Searching Authority, PCT/US2014/037118, dated Sep. 5, 2014.

* cited by examiner

*Primary Examiner* — Bentsu Ro
*Assistant Examiner* — Zemenay Truneh
(74) *Attorney, Agent, or Firm* — Womble Bond Dickinson (US) LLP

(57) ABSTRACT

The present invention relates to a motor assembly, a method of operation thereof and a transport vehicle provided with the motor assembly. The motor assembly is provided with an energy source switching controller that is in synchronization with motor operation and provides an improved utilization of energy storage sources in an electric, hybrid electric, or fuel cell based motor vehicle drive train application.

10 Claims, 7 Drawing Sheets

SYNCHRONOUS ENERGY SOURCE SWITCHING CONTROLLER AND METHOD OF OPERATION THEREOF

CROSS REFERENCE TO RELATED APPLICATIONS

N/A

FIELD OF THE INVENTION

Present invention relates to a motor assembly, a method of operation thereof and a transport vehicle provided with the motor assembly. The present invention particularly relates to a motor assembly provided with an energy source switching controller that is in synchronization with motor operation and, in particular, but not exclusively, provides an improved utilization of super capacitor/battery or battery/battery based energy storage sources in an electric, hybrid electric, or fuel cell based motor vehicle drive train application.

BACKGROUND OF THE INVENTION

The demand for automobiles with electric propulsion is increasing due to the diminishing oil supply and concerns on Carbon emission to the atmosphere. Promising solutions including pure electric, hybrid electric or fuel cell based motor vehicles. Each of these systems is limited by the energy source that can supply power to the drive train. The following discussions are directed to hybrid electric vehicles, but one skilled in the art would recognize that this invention is also applicable to other vehicles such as pure electric or fuel celled based drive train.

Prior art energy source switching is controlled by a vehicle controller. Connection to the motor/motor controller from an energy source is made by turning on a switching element such as a contactor or a switching transistor. When an energy source is switched onto the motor/motor controller, the load presented to the energy source could be such that the in rush current could exceed the current limit of the switching element, effectively destroying it. It is for this reason a pre-charge circuit is used to ensure the voltage difference across the switching element is small and the in rush current is limited. However, when the energy source is being switched on with the motor controller engaged, the charge and/or discharge current are so high that effectively nullify the function of the pre-charge circuit and the voltage difference across the switching element remains large, and the switching on operation must be aborted and retried. It is also destructive when the energy source is being switched off with the motor controller engaged. As the switch was being opened and the switch contact resistance increased, the constant current demand forced the contact element to heat up rapidly, and as the switch opened, an electric arc is often formed across the open contact and destroyed the switch mechanism. It is for this reason most prior art vehicle controller design only allows source switching while vehicle is at rest, not during active drive cycles. It is desirable to have energy source switching in synchronization with motor controller. It allows deterministic engagement and disengagement of energy source to the power train, and remove the vehicle at rest constraint.

Super capacitors or batteries are often used as energy sources for electric propulsion. For vehicle designs intended to have substantive all-electric range, the energy storage source must store sufficient energy Kilowatt-hour (kWh) to satisfy the range requirement in real-world driving. The energy storage sources must be sized to provide adequate peak power (kW) for the vehicle to have a specified acceleration or hill climbing and top speed performance and the capability to meet appropriate drive cycles. These requirements will vary significantly depending on the vehicle drive train design, but they are reasonably straightforward to determine once the vehicle performance targets are established. However, real life road conditions often exceed the design target, and vehicle performance suffers. Since super capacitors can deliver peak power beyond even the most demanding driving conditions, it is a favored energy source for vehicle applications in this perspective. But super capacitors are expensive, and their energy volume density is low. One cannot pack sufficient super capacitors to sustain a long drive. On a 12-meter bus filled with super capacitors, the range is only 10 Kilometers, requiring many charge stations in the bus route. This approach is not popular, once the bus operator realized that single charge station failure would bring down the entire bus route operation. Super capacitors are more suitable for hybrid application with limited fuel saving capability. Super capacitor only systems are also known to run out of energy in the middle of a long hill climb. A super capacitor/battery dual source system are common, but the system often drains the super capacitor source too quickly, and the battery source does not have enough head room to handle peak energy requirement above the design limits.

Multiple energy sources are deployed for safety, flexibility, and reliability reasons. Only one of the energy sources is active at any time. Inactive energy sources can be charged by on board generators from either fuel cells, gasoline, or natural gas means, to extend the range of operation. When one energy source is depleted or damaged, another energy source is switched on, and the vehicle operation is resumed. Multiple energy sources could also be designed to enable fast swapping, further enhance the flexibility in operation. For multiple energy sources, each and every energy source must meet the peak power requirement individually, while collectively, or through fast swap means, can meet the driving range requirement. Not all energy sources need to be of the same element or chemistry composition. A super capacitor source based energy source can be paired with a battery source, or a power type battery source can be paired with that of the energy type. Prior art multiple source management is controlled by a vehicle controller. Decision for switching on or off an energy source is often based on the charge level of the energy source or State of the Charge (SOC). When SOC of the current source reaches a low limit, switch it off and switch on an energy source with higher SOC. Connection to the motor/motor controller of an energy source is made by turning on a switching element such as a contactor or a switching transistor. When an energy source is switched onto the motor/motor controller, the load presented to the energy source could be such that the in rush current could exceed the current limit of the switching element, effectively destroying it. It is for this reason a pre-charge circuit is used to ensure the voltage difference across the switching element is small and the in rush current is limited.

Precharge circuit, however, does not work when the motor/motor controller is engaged as described before. Failure to switch on an energy source during a drive cycle means the power is lost to the drive train. Sudden lost of power can lead to accident during a drive cycle. It is for this reason some prior art vehicle controller design only allows source switching while vehicle is at rest, not during active drive cycles. There are prior art super capacitor/battery multiple source systems that couple to the two with diodes rather than switches. Such architecture severely limits the operating voltage range of super capacitors and lowers the energy storage of super capacitors.

Battery or super capacitor based energy sources are a major cost item in an electric vehicle. It is desirable to meet the peak power requirement through the collaborative operations of multiple sources instead of designing each and every energy source to meet the peak power requirement. Collaborative operation means the energy sources can be scaled downwards and significant cost savings realized. It is also desirable to switch on/off energy source during the drive cycle without power interruption.

SUMMARY OF THE INVENTION

A synchronous energy source switching controller system is disclosed. The system comprises a plurality of switching elements controlled by a controller that allows very rapid switching on and off of an energy source during an active drive cycle. Said controller allows switching in synchronization with motor operation to ensure no large in rush current would occur that could destroy the switching elements. Rapid switching of multiple energy sources during a drive cycle yields unique system performance and efficiency merits.

Accordingly, an aspect of the present invention is directed to a motor assembly for switchably engaging with and receiving power from one of energy storage sources connected in parallel. The energy storage sources each has a positive electrode and a negative electrode. The motor assembly comprises:
  a multi-phase motor;
  a motor controller comprising:
    a voltage-stabilizing module adapted for selective connection to the positive electrode and the negative electrode of one of the energy storage sources; a plurality of switching modules for switching on/off the energy storage sources, the switching modules having an amount equal to that of the energy storage sources and coupling between the respective energy storage sources and the respective voltage-stabilizing modules, wherein the switching modules each has a precharge switch for limiting an in-rush current and an energizing switch connected in parallel to the precharge switch and having a lower resistance than the precharge switch;
a detection module for detecting a output voltage difference between the positive and negative electrodes of one of the energy storage sources and a voltage difference between two ends of the voltage-stabilizing module connected to the one of the energy storage sources if the multi-phase motor is to be receiving power from the one of the energy storage sources; and a phase-controlling module for selectively energizing the multi-phase motor;
and a system controlling device for selectively switching on/off the precharge switch and the energizing switch controlling the phase-controlling module upon receipt of the output voltage difference of one of the energy storage sources and the voltage difference between the two ends of the voltage-stabilizing module from the detection module.

Another aspect of the invention is directed to a method for switchably permitting transmission of power from one of energy storage sources connected in parallel to a multi-phase motor using a motor controller commanded by a system controlling device. The energy storage sources each has a positive electrode and a negative electrode. The motor controller comprises a voltage-stabilizing module adapted for selective connection to the positive electrode and the negative electrode of one of the energy storage sources; a plurality of switching modules for switching on/off the energy storage sources, the switching modules having an amount equal to that of the energy storage sources and coupling between the respective energy storage sources and the respective voltage-stabilizing modules, each switching modules having a precharge switch for limiting an in-rush current and an energizing switch connected in parallel to the precharge switch and having a lower resistance than the precharge switch; a detection module for detecting a output voltage difference between the positive and negative electrodes of one of the energy storage sources and a voltage difference between two ends of the voltage-stabilizing module connected to the one of the energy storage sources if the multi-phase motor is to be receiving power from the one of the energy storage sources; a phase-controlling module for selectively energizing the multi-phase motor; and the system controlling device for switching on/off the precharge switch and the energizing switch controlling the phase-controlling module upon receipt of the output voltage difference of one of the energy storage sources and the voltage difference between the two ends of the
  voltage-stabilizing module from the detection module. The method comprises the steps of:
    a) receiving a command from the system controlling device to determine which one of the energy storage sources supplies power to the multi-phase motor;
    b) using the detection module to detect whether the one of the energy storage sources has an energy level higher than a predetermined threshold;
    c) turning off the phase-controlling module;
    d) turning on the precharge switch corresponding to the one of the energy storage sources, so that the voltage difference across the voltage-stabilizing module approaches the output voltage difference of the one of the energy storage sources;
    e) turning off the precharge switch and turning on the energizing switch corresponding to the one of the energy storage sources to electrically connect the one of the energy storage sources to the multi-phase motor; and
    f) using the system controlling device to command the phase-controlling module to selectively energize the multi-phase motor and to perform a drive cycle duty.

A still another aspect of the invention is directed to a transport vehicle provided with the motor assembly described above. The vehicle comprises: a plurality of energy storage sources connected in parallel, each having a positive electrode and a negative electrode; a motor assembly described above, comprising: a multi-phase motor;
  a motor controller comprising:
    a voltage-stabilizing module adapted for selective connection to the positive electrode and the negative electrode of one of the energy storage sources; a plurality of switching modules for switching on/off the energy storage sources, the switching modules having an amount equal to that of the energy storage sources and coupling between the respective energy storage sources and the respective
  voltage-stabilizing modules, wherein the switching modules each has a precharge switch for limiting an in-rush current and an energizing switch connected in parallel to the precharge switch and having a lower resistance than the precharge switch; a detection module for detecting a output voltage difference between the positive and negative electrodes of one of the energy storage sources and a voltage difference between two ends of the voltage-stabilizing module connected to the one of the energy storage sources if the multi-phase motor is to be receiving power from the one of the energy storage sources; and a phase-controlling module for selectively energizing the multi-phase motor; and a system controlling device for switching on/off the precharge switch and the energizing switch controlling the phase-controlling module upon receipt of the output voltage difference of one of the energy storage sources and the voltage difference between the two ends of the voltage-stabilizing module from the detection module. Since all of the phase-controlling devices are turned off before the energy storage sources are switched from one to another, no large in rush current would be generated during the switching of the energy storage sources to destroy the downstream multi-phase motor. The voltage flowing to the multi-phase motor is surely maintained at a desired level by virtue of the voltage-stabilizing module in cooperation with the switching module. The invention enables switching of the energy storage sources from one to another while the vehicle is running on the road and, as an advantageous result, the vehicle can reach its best performance under any condition according to the invention disclosed herein. The invention also allows some of the energy storage sources that have higher pulse power capability but shorter duration to be reserved for use under a particular drive condition requiring high vehicle performance.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
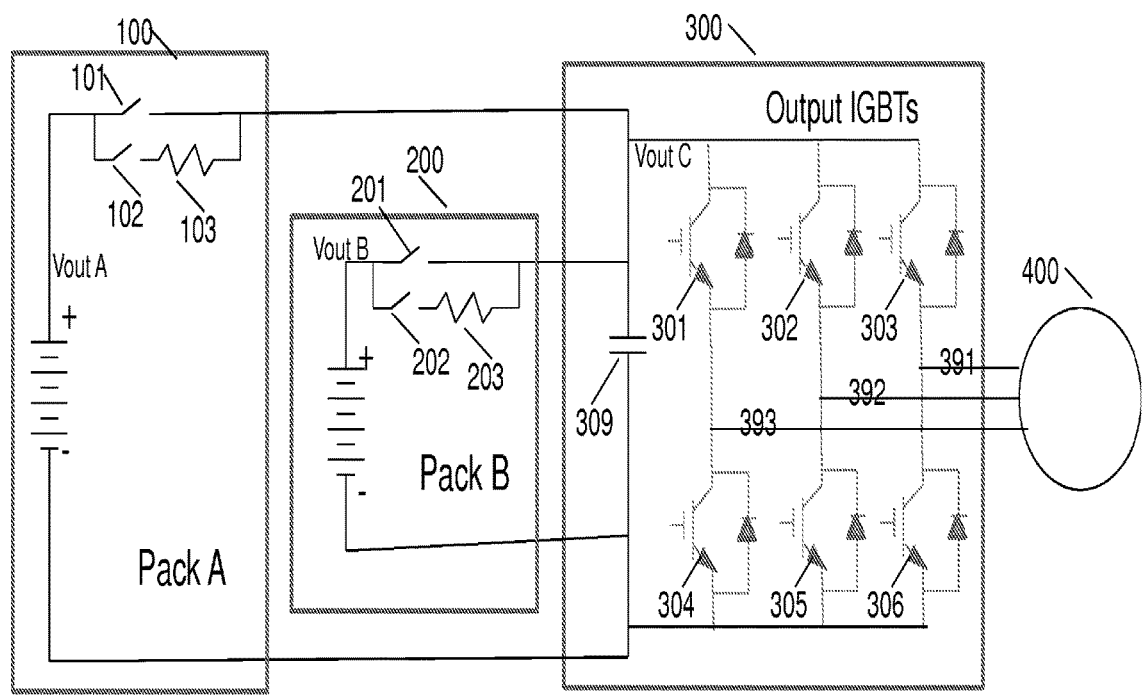
FIG. 1 is a prior art dual energy pack circuit diagram.

FIG. 1 shows a prior art dual energy pack circuit diagram. Pack A, 100, and pack B, 200, are connected to the motor controller 300. Motor controller's key function is to selectively close one of the six output switches 301, 302, 303, 303, 304, 305, or 306, typically made out of insulating gate bipolar transistors (IGBT) and altogether referred to as a phase-controlling module, and allow current to flow in or out of connections 391, 392, and 393 to cause motor 400 to rotate in either forward or reverse directions.

In this prior art example the motor is an AC induction motor. Different driving current waveforms can be used for different motor constructions. IGBT switching frequency is in the 100 Khz range, allowing very fine control of the amount of current flowing in or out of the motor. In an active drive cycle, voltage across capacitor 309, Vout C has a large swing. If pack A switch 101 is closed when there is a big voltage difference between Vout A and Vout C, very large current will rush across switch 101, the magnitude is the voltage difference divided by the internal resistance of the switch, and can destroy the switch 101.

Prior art energy pack switching control method requires the motor to be out of the drive cycle, and all motor controller output IGBTs are open, therefore the voltage across capacitor 309, Vout C is a DC voltage. Switch 102 is closed first, and the current rushing across switch 102 is the voltage difference between Vout A and Vout C divided by the sum of switch 102 internal resistance and resistor 103. Resistor 103 has a higher resistance than the switch 102 internal resistance in order to limit the amount of current flowing through it and switch 102.

When the voltage difference between Vout A and Vout C is small enough, then switch 101 can be closed, completing the connection of energy pack A to the motor controller. Connection of energy pack B can be done with this method. It is not a good idea to connect both pack A and pack B to the motor controller at the same time, however, because Vout A and Vout B may not be of the same voltage, and very large current can flow between pack A and pack B, and destroying switch 101 or switch 102 or both.

Figure 2:
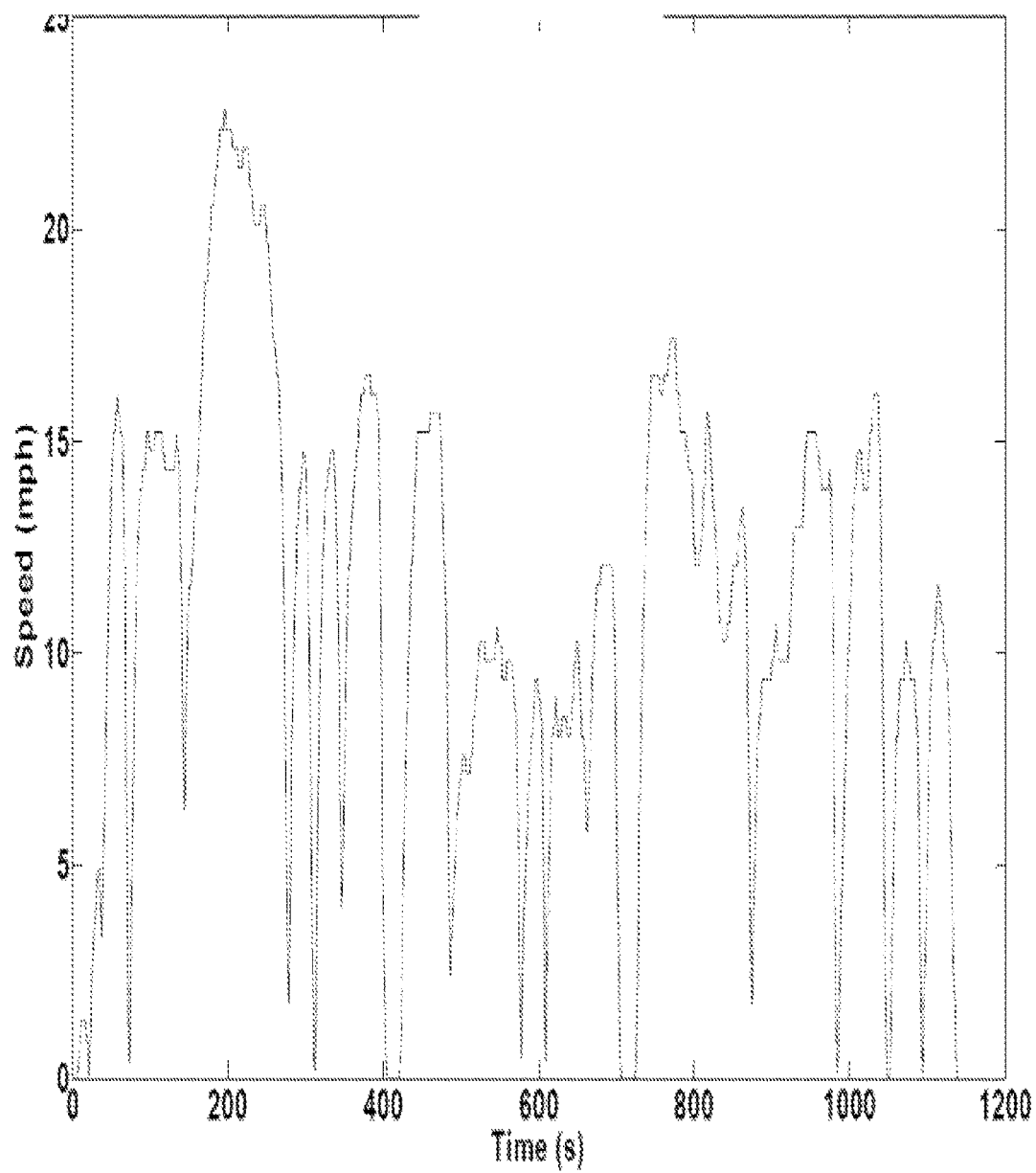
FIG. 2 is an example of real-world drive cycles.

FIG. 2 is an example of real-world drive cycles, a plot of vehicle speed vs. time. Over the 1200-second time, there are many accelerations and decelerations. Accelerations are powered by supplying current to the motor controller, and for the motor controller to turn on off output IGBTs in order to generate driving waveforms to the motor, and for the motor to generate torque to move the vehicle forward. During deceleration, the motor is used as an electric generator, and the power is regenerated and feed back to the energy sources. In order to meet the rapid charge and discharge cycles, output IGBT on/off control must be performed rapidly, typically in the 100 KHz range, and fast enough to support the operation of present invention.

Figure 3:
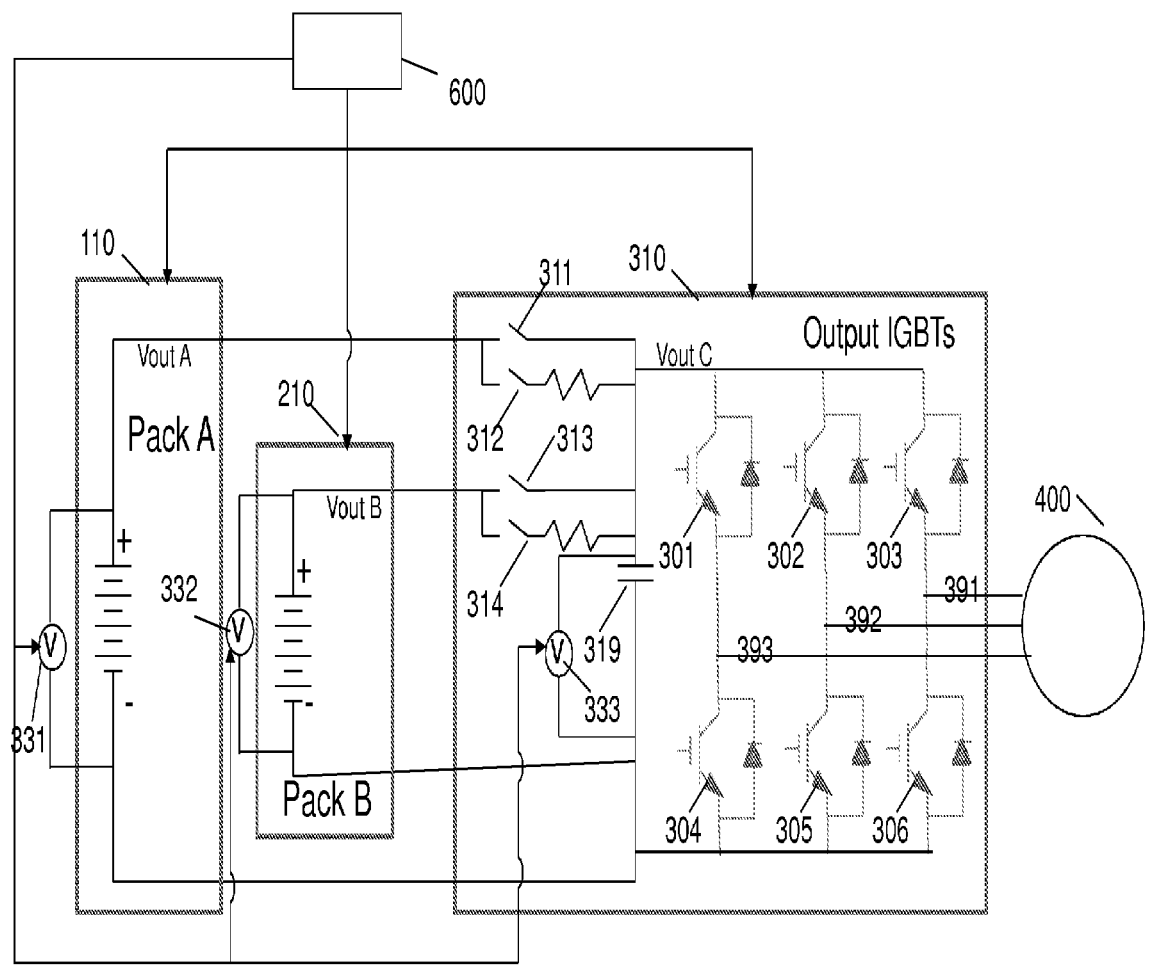
FIG. 3 is a schematic circuit diagram of the motor assembly according to the first preferred embodiment of the invention.
Figure 7:
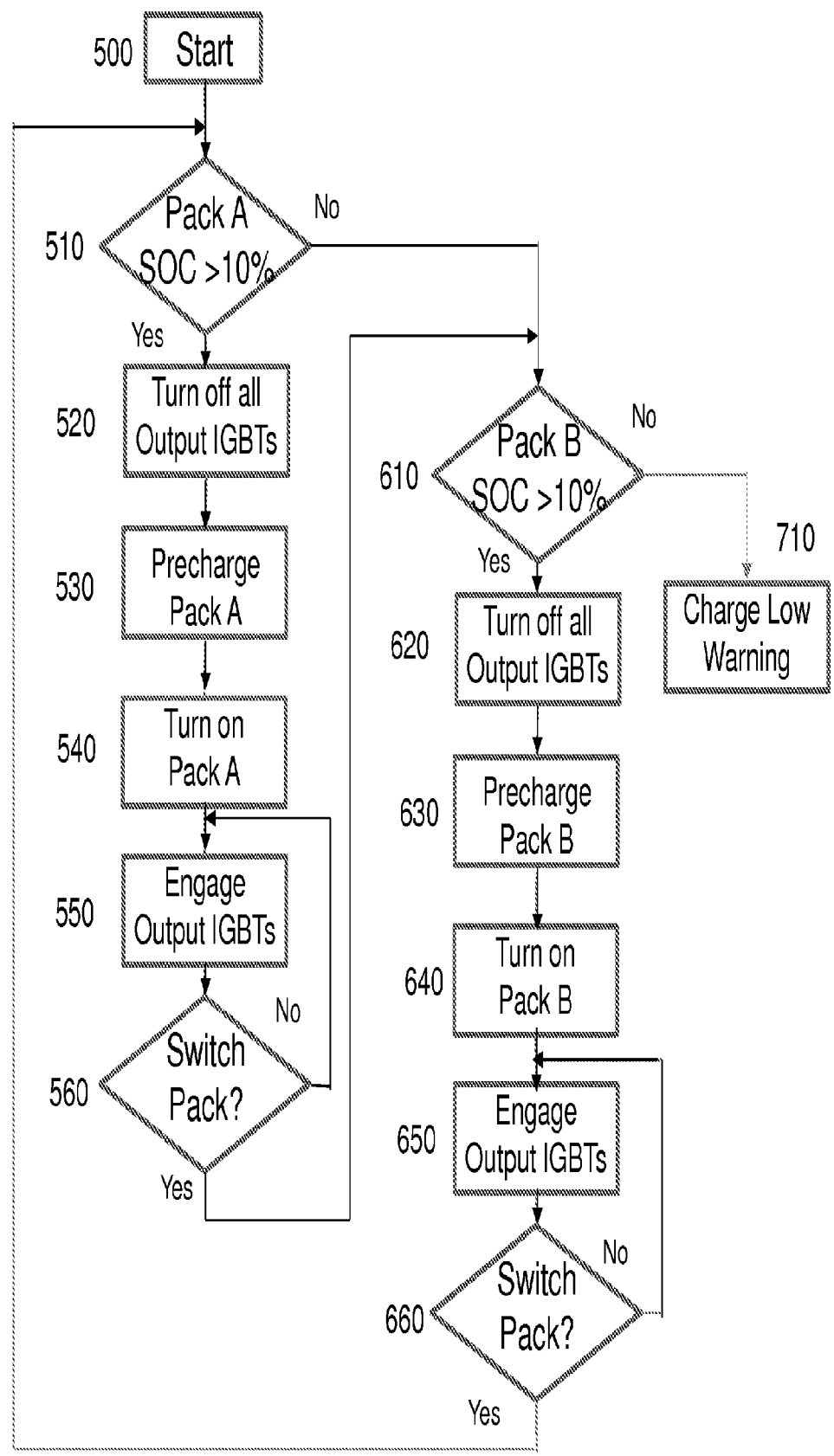
FIG. 7 is a flowchart of energy source switching control for the embodiment shown in FIG. 3.

FIG. 3 shows a preferred embodiment of a motor assembly provided with an energy source switching controller. From the circuit element perspective, the preferred embodiment is similar to prior art, with the difference being switch controls are performed by the motor controller. When a command is issued to the motor controller to perform pack A connection, the motor controller can perform switch 312 closure in synchronization with the turning off of all output IGBTs for the precharge operation, and the switch 311 closure for pack A connection. Switch synchronization with motor controller allows pack switching in the middle of the drive cycle, as long as the output IGBTs 301, 302, 303, 304, 305, and 306 are not active. Advantages of switching packs in the middle of the drive cycle will be explained further. FIG. 7 is a flowchart of energy storage source switching control for a motor assembly. When a system controlling device 600 receives a command indicating that the energy pack A designated by numeral 110 need to be connected to the motor controller 310, as shown in step 500, pack A 110 is first checked for state of the charge that is high enough to support driving, shown as step 510. In this example, the minimum condition is set at SOC>10%. If pack A indeed has enough energy, then in step 520, all output IGBTs 301, 302, 303, 304, 305, 306 in the phase-controlling module are turned off.

In step 530, the precharge switch 312 is closed, allowing Vout C across a capacitor 319 which serves as a voltage-stabilizing module to slowly charge or discharge the pack A 110, so as to make Vout C approach to the same level as the output voltage from pack A, namely Vout A. The sensors 331, 332, 333 in the detection module detect both of Vout C and Vout A and the detected values are transmitted to the system controlling device 600. When the system controlling device 600 confirms that Vout C is close enough to Vout A to an extent that the difference therebetween is within a predetermined range, in step 540, the energizing switch 311 is closed and the precharge switch 312 is opened under the command of the system controlling device 600 to complete the connection of the pack A 110 to the motor 400.

Finally, in step 550, the system controlling device 600 commands that the output IGBTs 301, 302, 303, 304, 305, 306 be engaged to allow power transmission from the pack A 110 to the motor 400 and to perform drive cycle duties. Alternatively, if the SOC of the pack A 110 is measured to be at a low energy level in step 510, the system controlling device 600, in step 610, would command a pack switching from the pack A 110 to the pack B designated by numeral 210. Then, the pack B 210 is subjected to the same procedure as that for the pack A 110 described above. If pack B 210 indeed has enough energy, then in step 620, all output IGBTs 301, 302, 303, 304, 305, and 306 are turned off. In step 630, precharge switch 314 is closed, allowing Vout C across capacitor 319 to charge or discharge slowly to the same level as Vout B. When the system controlling device 600 determines that the Vout C detected by the sensors 331, 332, 333 in the detection module is close enough to Vout B, in step 640, the switch 313 is closed and the switch 314 is opened under the command of the system controlling device 600 to complete the connection of turning on pack B 210. In step 650, the system controlling device 600 commands that the motor controller can engage output IGBTs 301, 302, 303, 304, 305, and 306 to energize motor 400 and to perform drive cycle duties. In step 710, if both pack A 110 and pack B 210 are out of energy, then a charge low warning is submitted to the vehicle controller and to the driver display.

Figure 4:
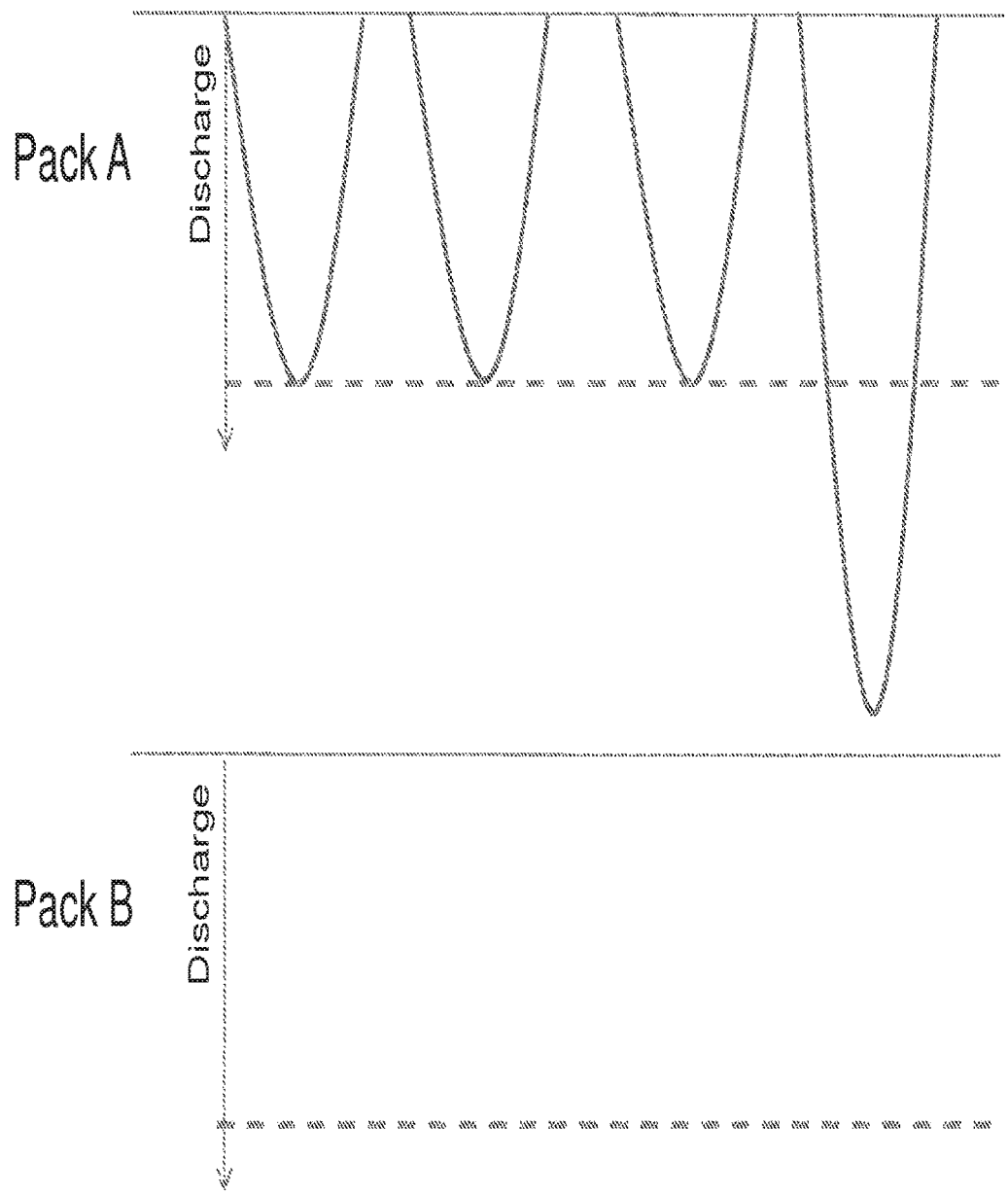
FIG. 4 is a prior art discharge current waveform.

FIG. 4 shows the current waveforms for prior art dual energy packs. As in the convention of the industry, the discharge current is shown in the negative direction. Both pack A and pack b are battery packs, with relatively flat output voltages. For this example, the current waveforms are proportional to the pack discharge energy levels. Pack A is of power type that can release high power in a short time but is more expensive and with lower energy density. Pack B is of energy type that cannot release high power in a short time and the maximum output power level is represented by the dash line.

In this example, pack A is engaged in the drive cycle exclusively since switching is not allowed in the middle of a drive cycle. In certain driving conditions, pack A energy would be exhausted and the vehicle must be stopped to switch to pack B, and the vehicle performance suffers because pack B cannot give the same power performance, even though it does allow enough energy to drive longer distances.

Figure 5:
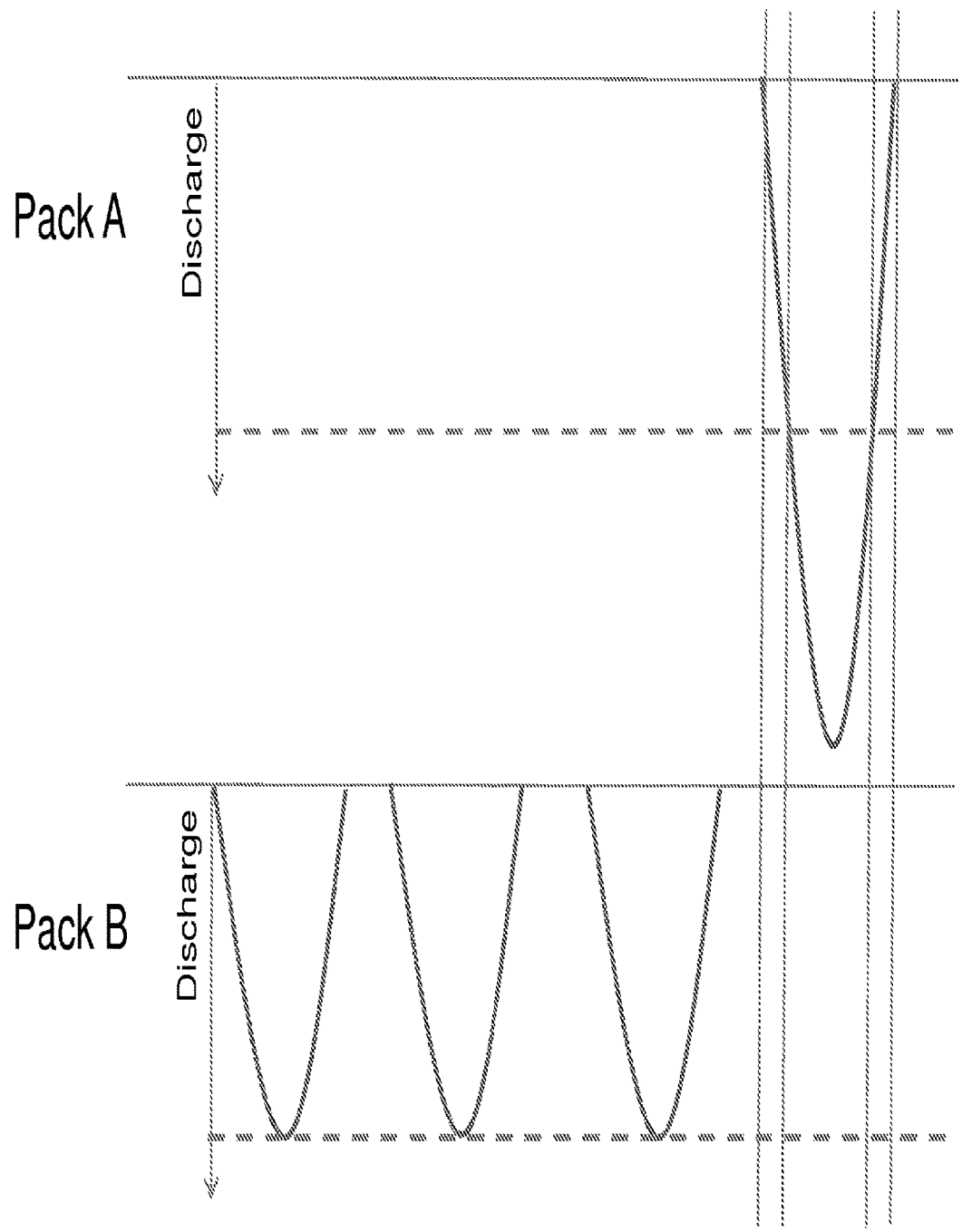
FIG. 5 is a preferred embodiment discharge current waveform.

FIG. 5 shows a preferred embodiment of the current invention current waveform for a dual battery pack in a drive cycle. In this example, the first 3 discharge cycles were supplied by pack B, while the subsequent cycle was supplied by pack A. Pack switching is performed using the pack switching control flow described earlier. This control method can be realized in a bus route where route parameters are known and the motor controller realized that the following 3 discharge cycles would be within the limit of pack B and the $4^{th}$ cycle would be out of the limit of pack B and pack switching must be performed. In this example, lower level energy requirement was supplied by pack B, therefore higher energy pack A is available for longer driving range, the improved vehicle performance is due to this new invention of pack switching during a drive cycle. Optionally, the high energy pack A is reserved and not used until the vehicle is going to drive on a particular section of road with high power requirement, such as a hill climbing section in a known route.

Figure 6:
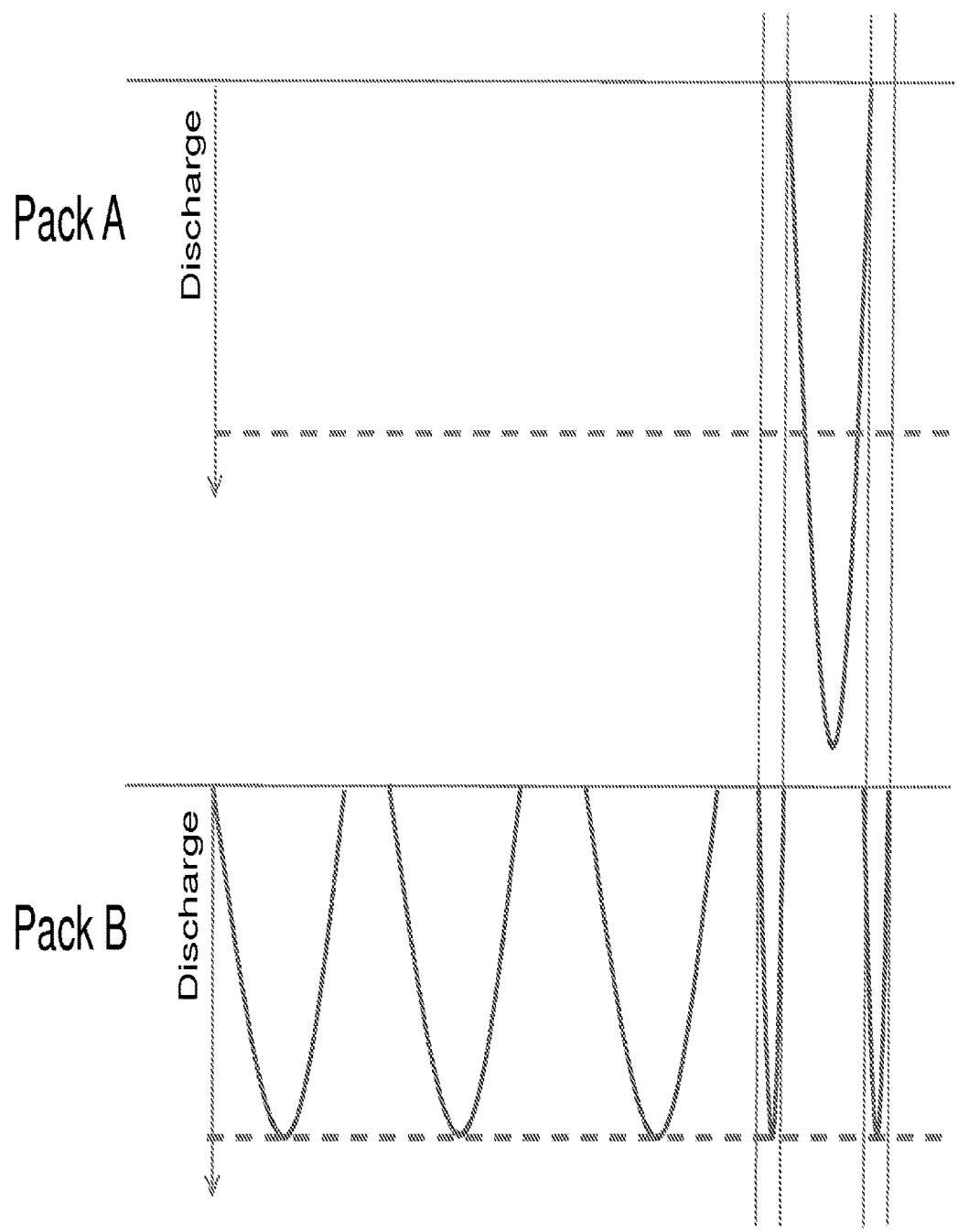
FIG. 6 is another preferred embodiment discharge current waveform.

FIG. 6 shows another preferred embodiment of the present invention where the control strategy always start with pack B, and as soon as pack B power limit is reached, switch to pack A. In this example, higher power pack A is also available for longer driving range because pack B also allocated energy to the drive cycle.

It is apparent to those skilled in the art that the energy storage sources described above can alternatively be in the form of super capacitors. In this case, pack A could be made out of super capacitors. Improvement in vehicle performance is dramatic because pack A alone driving range is very small, and dual pack switching significantly increase the hill climbing performance, both in grade and distance. It is known that pulse power capability of a battery pack is higher than the continuous operation. This fact can be used in battery-battery multiple source systems to boost power temporarily by switching back and forth quickly while in drive cycle.

The foregoing description of the illustrated embodiments of the present invention is by way of example only, and other variations and modifications of the above-described embodiments and methods are possible in light of the foregoing teaching. For example, energy source switching controller could resides within the vehicle controller or battery pack controller, with hardware synchronization means with motor operation, and battery packs could be used for power delivery of lifting and pumping applications, controller could be implemented for locomotive applications. The embodiments described herein are not intended to be exhaustive or limiting. The present invention is limited only by the following claims.

What is claimed is:

1. A motor assembly for switchably engaging with and receiving power from one of
    energy storage sources connected in parallel, the energy storage sources each having a positive electrode and a negative electrode, the motor assembly
  comprising:
    a multi-phase motor;
    a motor controller comprising:
    a voltage-stabilizing module adapted for selective connection to the positive electrode and the negative electrode of one of the energy storage sources;

a plurality of switching modules for switching on/off the energy storage sources, the switching modules coupling between the respective energy storage sources and the voltage-stabilizing module, wherein the switching modules each has a precharge switch for limiting an in-rush current and an energizing switch connected in parallel to the precharge switch and having a lower resistance than the precharge switch;

a detection module for detecting an output voltage difference between the positive and negative electrodes of one of the energy storage sources and a voltage difference between two ends of the voltage-stabilizing module connected to the one of the energy storage sources if the multi-phase motor is to be receiving power from the one of the energy storage sources;

a phase-controlling module for selectively energizing the multi-phase motor; and the motor controller configured to:
turn off the phase-controlling module, in a middle of a drive cycle;
turn on the precharge switch of one of the plurality of switching modules;
turn off the precharge switch of the one of the plurality of switching modules;
turn on the energizing switch of the one of the plurality of switching modules; and
engage the phase-controlling module to perform drive cycle duties, having switched from one of the energy storage sources to another of the energy storage sources in the middle of the drive cycle.

2. The motor assembly according to claim 1, wherein the voltage-stabilizing module is a capacitor.

3. The motor assembly according to claim 1, wherein the phase-controlling module comprises a plurality of insulating gate bipolar transistors.

4. A transport vehicle, comprising:
a plurality of energy storage sources connected in parallel, each having a positive electrode and a negative electrode;
a motor assembly, comprising:
a multi-phase motor;
a motor controller comprising:
a voltage-stabilizing module adapted for selective connection to the positive electrode and the negative electrode of one of the energy storage sources;
a plurality of switching modules for switching on/off the energy storage sources, the switching modules coupling between the respective energy storage sources and the voltage-stabilizing module, wherein the switching modules each has a precharge switch for limiting an in-rush current and an energizing switch connected in parallel to the precharge switch and having a lower resistance than the precharge switch;
a detection module for detecting an output voltage difference between the positive and negative electrodes of one of the energy storage sources and a voltage difference between two ends of the voltage-stabilizing module connected to the one of the energy storage sources if the multi-phase motor is to be receiving power from the one of the energy storage sources;
a phase-controlling module for selectively energizing the multi-phase motor; and
the motor controller configured to:
turn off all output devices of the phase-controlling module, in a middle of a drive cycle;
close the precharge switch of one of the plurality of switching modules;
open the precharge switch of the one of the plurality of switching modules;
close the energizing switch of the one of the plurality of switching modules; and
turn on the phase-controlling module to perform drive cycles, responsive to switching from one of the energy storage sources to another of the energy storage sources in the middle of the drive cycle.

5. The transport vehicle according to claim 4, wherein the energy storage sources comprise at least one DC battery module.

6. The transport vehicle according to claim 5, wherein the energy storage sources further comprise at least one super capacitor having larger in-rush output current than that of the at least one DC battery module.

7. A transport vehicle, comprising:
a plurality of energy storage sources connected in parallel, each having a positive electrode and a negative electrode;
a motor assembly, comprising:
a multi-phase motor;
a motor controller comprising:
a voltage-stabilizing module adapted for selective connection to the positive electrode and the negative electrode of one of the energy storage sources;
a plurality of switching modules, wherein the switching modules each has a precharge switch for limiting an in-rush current and an energizing switch connected in parallel to the precharge switch and having a lower resistance than the precharge switch;
a detection module for detecting a output voltage difference between the positive and negative electrodes of one of the energy storage sources and a voltage difference between two ends of the voltage-stabilizing module connected to the one of the energy storage sources if the multi-phase motor is to be receiving power from the one of the energy storage sources;
a phase-controlling module for selectively energizing the multi-phase motor; and
the motor controller configured to:
turn off the phase-controlling module, in a middle of a drive cycle;
turn on the precharge switch of one of the plurality of switching modules;
turn off the precharge switch of the one of the plurality of switching modules;
turn on the energizing switch of the one of the plurality of switching modules; and
engage the phase-controlling module to perform drive cycle duties, after disconnecting one of the energy storage sources and connecting another of the energy storage sources in the middle of the drive cycle.

8. The vehicle of claim 7, further comprising:
a system controlling device for switching on/off the precharge switch and the energizing switch controlling the phase-controlling module upon receipt of the output voltage difference of one of the energy storage sources and the voltage difference between the two ends of the voltage-stabilizing module from the detection module.

9. The transport vehicle according to claim 7, wherein the energy storage sources comprise at least one DC battery module.

10. The transport vehicle according to claim 7, wherein the energy storage sources further comprise at least one super capacitor having larger in-rush output current than that of the at least one DC battery module.

* * * * *